(12) United States Patent
Chang et al.

(10) Patent No.: US 9,706,450 B2
(45) Date of Patent: Jul. 11, 2017

(54) WIRELESS COMMUNICATION SYSTEM WITH ADJACENT BASE STATIONS TRANSMITTING A COMMON GROUP CELL IDENTIFIER

(75) Inventors: Henry Chang, San Diego, CA (US); Doug Dunn, San Diego, CA (US); Amit Kalhan, San Diego, CA (US); David Comstock, San Diego, CA (US)

(73) Assignee: Kyocera Corporation, Kyoto (JP)

( * ) Notice: Subject to any disclaimer, the term of this patent is extended or adjusted under 35 U.S.C. 154(b) by 949 days.

(21) Appl. No.: 13/466,710

(22) Filed: May 8, 2012

(65) Prior Publication Data

US 2013/0303081 A1    Nov. 14, 2013

(51) Int. Cl.
*H04B 7/15* (2006.01)
*H04W 36/00* (2009.01)
*H04W 36/32* (2009.01)
*H04W 8/18* (2009.01)

(52) U.S. Cl.
CPC ........ *H04W 36/0061* (2013.01); *H04W 8/186* (2013.01); *H04W 36/0088* (2013.01); *H04W 36/32* (2013.01)

(58) Field of Classification Search
CPC ............. H04W 36/0061; H04W 8/186; H04W 36/0088
USPC ..... 455/11.1, 550.1, 436; 370/392, 331, 315
See application file for complete search history.

(56) References Cited

U.S. PATENT DOCUMENTS

| | | | |
|---|---|---|---|
| 8,520,673 B2 * | 8/2013 | Chen et al. .................... | 370/390 |
| 2004/0192375 A1 * | 9/2004 | Cho et al. .................. | 455/550.1 |
| 2008/0095163 A1 * | 4/2008 | Chen ....................... | H04L 45/16 |
| | | | 370/392 |
| 2010/0248619 A1 * | 9/2010 | Senarath et al. ............. | 455/11.1 |
| 2010/0304748 A1 * | 12/2010 | Henttonen et al. ........... | 455/436 |
| 2011/0051687 A1 * | 3/2011 | Nakasato .............. | H04W 36/30 |
| | | | 370/331 |
| 2011/0194482 A1 * | 8/2011 | Ji .......................... | H04W 48/08 |
| | | | 370/315 |
| 2012/0182935 A1 * | 7/2012 | Addepalli et al. ............ | 370/328 |

* cited by examiner

*Primary Examiner* — Wesley Kim
*Assistant Examiner* — Raj Chakraborty

(57) ABSTRACT

A common group cell identifier is transmitted by adjacent base stations. Handover processing is minimized for mobile relays traveling along a predetermined path that traverses the adjacent base stations. A first base station along the path transmits a group cell identifier and a first single cell identifier within a first service area. An adjacent base station transmits the group cell identifier and a second single cell identifier within a second service area that at least partially overlaps the first service area. The mobile relay monitors the group cell identifier in certain situations and only performs a handover when the group cell identifier changes. As a result, no handovers are initiated as the mobile relay travels down the path since the group cell identifier transmitted by the base stations along the path are the same.

19 Claims, 8 Drawing Sheets

WIRELESS COMMUNICATION SYSTEM WITH ADJACENT BASE STATIONS TRANSMITTING A COMMON GROUP CELL IDENTIFIER

FIELD

This invention generally relates to wireless communications and more particularly to a wireless communication system where a common group cell identifier is transmitted by adjacent base stations.

BACKGROUND

Cellular and other wireless communication systems use base stations to provide wireless service to mobile wireless communication devices. Depending on the particular technology and preferences, a base station may be referred to as transceiver station, access node, access point, transceiver node, eNodeB, and eNB, as well as by other terms.

Base stations in cellular communication systems provide communications services to wireless communication devices within geographical cells where each base station exchanges signals with wireless communication devices within an associated cell. The size and shape of each cell is determined by several factors and are at least partially based on design parameters of the base station. In addition to large macro cells that provide services to numerous devices within relatively large geographical areas, some cellular communication systems are increasingly employing smaller cells to increase efficiency, improve coverage, improve the quality of service, and provide additional services. The smaller cells may include a variety of sizes typically referred to as microcells, picocells, and femtocells.

When a mobile wireless communication device moves from one cell to another, conventional systems require the mobile wireless communication device to perform a handover procedure. As the speed of the mobile wireless communication device increases, the handovers occur more frequently and the efficiency of the communication system diminishes.

SUMMARY

A common group cell identifier is transmitted by adjacent base stations. Handover processing is minimized for mobile relays traveling along a predetermined path that traverses the adjacent base station service areas. A first base station along the path transmits a group cell identifier and a first single cell identifier within a first service area. An adjacent base station transmits the group cell identifier and a second single cell identifier within a second service area that at least partially overlaps the first service area. The mobile relay monitors the group cell identifier in certain situations and only performs a handover when the group cell identifier changes. As a result, no handovers are initiated as the mobile relay travels down the path since the group cell identifier transmitted by the base stations along the path are the same.

DETAILED DESCRIPTION

Figure 1A:
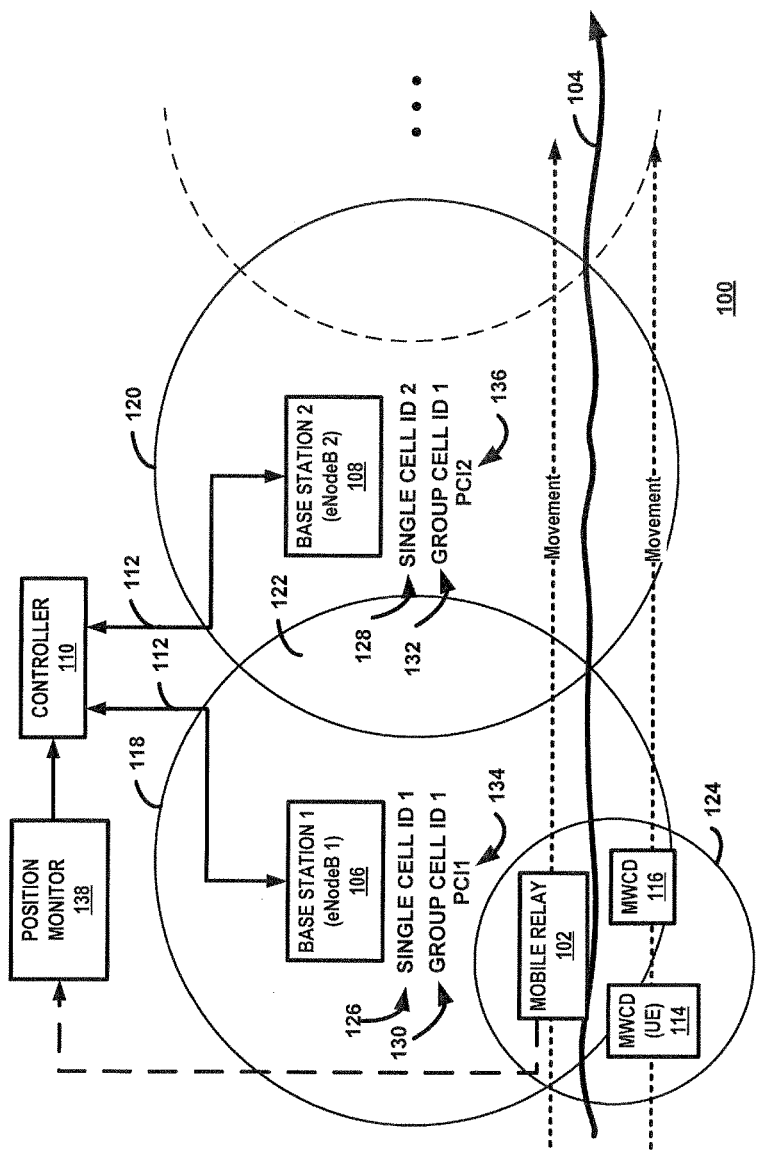
FIG. 1A is a block diagram of a communication system including a mobile relay that travels along a predetermined path relative to a plurality of base stations.

As described above, frequent handovers due to high speed of a mobile wireless communication device results in inefficient communication service, at a minimum. One example where the problem is evident occurs on high speed trains. High-speed railway is growing tremendously. The high speed, however, presents a challenge to provide reliable communications for travelers. Presently, high-speed railways' communication falls far short of users' demand. In order to support reliable communications for travelers, the network deployment must resolve two types of challenges. First, at high speed, such as above 250 km/h, mobile wireless communication devices pass through multiple cells in a very short time. This causes excessive signaling load to the network and will often lead to dropped calls. Second, in current networks, it can take up to 6 seconds for a mobile wireless communication device to complete a handover between cells, while it usually takes much less than 6 seconds for high-speed trains at top speed to pass through the overlap region of two cells. As a result, mobile wireless communication devices cannot reliably complete handovers leading to dropped calls.

A potential technique to solve the above problems includes using a mobile relay located on the train. The mobile relay is wirelessly connected to the fixed base stations (donor macro cells). Handover success rate can be improved since excessive handover signaling is avoided by performing a group mobility procedure instead of individual mobility procedures for every mobile wireless communication device. Even with the reduced number of individual mobile wireless communication device handovers, however, the mobile relays will experience handovers at an excessive rate. The restricted handover procedure described herein allows for high-speed mobility when the mobile relay on a high-speed train moves through cells.

A communication system includes a plurality of base stations along a path of a mobile relay. The mobile relay communicates with the base stations to provide communication service to mobile wireless communication devices. The mobile wireless communication devices receiving service and communicating with the mobile relay have a relatively slow motion with respect to the moving relay as compared to the motion of the mobile wireless communication devices relative to the base stations. A typical scenario includes the mobile relay being carried by a train and providing service to mobile wireless communication devices within the train. The techniques used by the mobile wireless communication devices to receive service from the mobile relay are similar to conventional techniques used by mobile wireless communication devices to receive service from base stations. Since the mobile relay is moving in the same general direction and speed as the mobile wireless communication devices, however, the mobile wireless communication devices do not need to engage in frequent handover procedures as would be necessary if the mobile wireless communication devices were receiving service from the base stations.

In order to reduce processing of handovers of the mobile relay, the base stations along the mobile relay path transmit the same cell identifier (cell ID). This common cell ID, referred to herein as a group cell ID, is transmitted by base stations having adjacent service areas through which the mobile relay is moving. The mobile relay monitors the control channel, such as a broadcast channel, transmitting the control messages, such as the System Information message, with the group cell ID from the base stations. A handover procedure is initiated when the mobile relay detects a group cell ID with a value that is different from the previously received group cell ID. Such a restricted handover scenario is distinguishable from a situation where the bases stations only transmit unique cell IDs. In such a situation, the mobile relay monitors the cell ID, reports the changes in PCI, and reports a signal measurement to initiate a handover procedure for each base station as it travels through the cells. For the examples herein, however, the aggregate service area formed by the individual service areas of the base stations appears as a single cell from the perspective of the mobile relay for purposes of handovers. The PCIs are used for communication purposes and, therefore, are still monitored by the mobile relay. In the examples discussed below, the base stations are synchronized such that downlink transmissions from the base stations arrive at the mobile relay within expected time periods. The position of the mobile relay is monitored in order to assign the appropriate base station along the path to communicate with the mobile relay at the appropriate time. In the examples, the network monitors the position of the mobile relay without receiving position information messages from the mobile relay. Since the path is known, various known techniques that apply parameters such as mobile relay speed and global positioning system (GPS) data can be used to track the position of the mobile relay, for example. Existing and proposed high-speed train systems include position tracking mechanisms that can be applied to monitor the position of the mobile relay.

As discussed below in further detail, when the mobile relay speed is sufficiently high, the mobile relay is instructed to monitor a control channel used by base stations along the path of the mobile relay to transmit control messages that include a group cell ID of the transmitting base station. For the examples, each base station along the mobile relay path transmits two cell IDs where one of the cell IDs is a unique value corresponding to the base station or sector and a second cell ID is the value used by the mobile relay during the restricted handover state. The unique cell ID corresponding to the individual base stations is a conventional Cell Identity (Cell ID) and referred to herein as a single cell ID. The cell ID used by mobile relays during the restricted handover state is referred to herein as a group cell ID. When using the group cell ID, the mobile relay invokes a handover procedure only when a new group cell ID is received. In other words, the mobile relay compares a stored group cell ID received from a base station to the group cell ID received from the next base station along the path. If the value of the group cell ID received from the next base station is different from the previously received stored value, the relay invokes a handover procedure by reporting a signal measurement report to the network. Otherwise, the mobile relay continues to monitor the group cell ID and uses the appropriate PCI to communicate with the next base station. The mobile relay, therefore, continues to use the group cell ID to determine whether to invoke a handover operation for the next base station along the path. In conventional handover procedures, the mobile relay initiates the handover procedure by sending a measurement report to the source base station. The source base station communicates with the next (target) base station to coordinate the handover. The source base station instructs the mobile relay to perform the handover, if the handover is granted. For the examples herein, however, the mobile relay will refrain from sending a measurement report to the source base station when the group cell ID received from the next base station is the same as the stored group cell ID. The mobile relay, therefore, does not receive a handover instruction from the source base station even though it will transition to the next base station. The exchange of handover information (context transfer) between the source base station and the target base station remains intact as compared to conventional systems and only the handover procedures involving the over-the-air signaling exchange between the mobile relay and the source base station is omitted. The exchange of the handover information between the source base station and the target base station is triggered by the tracked position of the mobile relay and not by a measurement report.

FIG. 1 is a block diagram of a cellular communication system 100 including a mobile relay 102 that travels along a predetermined path 104 relative to a plurality of base stations 106, 108. The various functions and operations of the blocks described with reference to the communication system 100 may be implemented in any number of devices, circuits, or elements. Two or more of the functional blocks may be integrated in a single device and the functions described as performed in any single device may be implemented over several devices. For example, at least some of the functions of the controller may be performed by the base stations. A cellular communication system is typically required to adhere to a communication standard or specification. The Third-Generation Partnership Project Long-Term Evolution (3GPP LTE) communication specification is a specification for systems where base stations (eNodeBs) provide service to mobile wireless communication devices using orthogonal frequency-division multiplexing (OFDM) on the downlink and single-carrier frequency-division multiple access (SC-FDMA) on the uplink. Although the techniques described herein may be applied in other types of communication systems, the exemplary systems discussed herein operate in accordance with a 3GPP LTE communication specification.

The base stations 106, 108 are fixed transceiver stations, sometimes referred to as eNodeBs or eNBs, which may include controllers in some circumstances. The base stations are connected to a network controller 110 through a backhaul 112 which may include any combination of wired, optical, and/or wireless communication channels. For the examples herein, the network controller 110 includes the functionality of the Mobility Management Entity (MME) and the Packet Gateway (P-GW). As discussed below, at least some of the functions of the network controller 110 may be performed by other devices in the system, such as the base stations, for example. In FIG. 1, a first base station 106 and a second base station 108 are shown. In a typical implementation, several base stations are arranged along the path.

The base stations are positioned along the predetermined path such that the mobile relay 102 can communicate with at least one of the base stations at every point along the path. The mobile relay 102 provides communication services to mobile wireless communication devices 114, 116 that are traveling in the same general direction and at approximately the same speed as the mobile relay 102. The mobile relay 102 may be traveling on a vehicle where passengers in the vehicle are using the mobile wireless communication devices 114, 116. For the examples discussed herein, the mobile relay 102 is positioned within a train car or otherwise associated with a train so that the mobile relay moves with the train car. Accordingly, a mobile wireless communication device 114 may move relative to the mobile relay 102 in many situations. If, for example, a user of mobile wireless communication device 114 is walking within the train car, the mobile wireless communication device 114 will have motion relative to the mobile relay 102. For the circumstances discuss in the examples, however, the motion of the mobile wireless communication devices 114, 116 relative to the mobile relay 102 is much slower than the motion of the mobile wireless communication devices 114, 116 relative to the base stations 106, 108.

The mobile wireless communication devices 114, 116 may be any kind of portable or mobile wireless transceiver device that can exchange wireless signals with the mobile relay 102 and the base stations 106, 108. Examples of wireless communication devices 114, 116, sometimes referred to as User Equipment (UE), UE devices, handsets, mobiles, or portables, include devices such as cell phones, smart phones, transceiver cards, modem cards, and other similar devices.

As discussed in further detail with reference to FIG. 3, the mobile relay 102 includes at least a transceiver for communicating with the base stations and a transceiver for communicating with the mobile wireless communication devices and includes other components such as controllers, memory devices, and power circuitry in the examples discussed. The mobile relay provides a service area within a cell where mobile wireless communication devices receive wireless service. The base stations exchange control signals as well as data signals with the mobile relay. The mobile relay exchanges control signals and data with the mobile wireless communication devices 114, 116 and, from the perspective of the mobile wireless communication devices 114, 116, appears as a base station. Accordingly, the mobile relay 102 transmits a reference signal and other control signals in ways similar to the transmissions of a base station.

Each base station 106, 108 provides a geographical service area 118, 120 along the predetermined path 104 such that the mobile relay 102 is within at least one of the geographical services areas 106 at every point along the path. At some positions, the mobile relay 102 is within two geographical service areas at the same time. For example, the mobile relay may be within two geographical service areas when positioned within the region 122 where the two areas overlap. The base stations 106, 108 can provide service directly to the mobile wireless communication devices 114, 116 or may provide service to the mobile wireless communication devices 114, 116 through the mobile relay 102. For the examples, communication service is provided through the mobile relay 102 to mobile wireless communication devices 114, 116 within a geographic service area 124 of the mobile relay when the mobile wireless communication devices 114, 116 are within the service area 124. Each of the base stations along the path transmits a single cell identifier (single cell ID) 126, 128 and a group cell identifier (group cell ID) 130, 132 where the group cell ID 130, 132 is the same for all base stations and the single cell ID 126, 128 is unique to each base station 106, 108. In addition, each base station also transmits a Physical Cell ID (PCI) 134, 136 that is at least unique relative to other base stations in the region. For the examples, the PCI 134, 136 is transmitted within the primary sync channel in accordance with the 3GPP LTE communication standard. The group cell ID and the single cell ID are broadcast in a System Information Block Type 1 Message (SIB1 message). The 3GPP LTE standard at the time of the filing of this patent application specifies only one cell identifier which is referred to as a Cell ID. In accordance with the embodiments herein, the SIB1 message is enhanced from the current standards such that the message also includes a Group Cell ID field. The conventional Cell ID field is utilized as the single cell ID and the Group Cell ID field is used for the group cell ID in the embodiments discussed herein.

As mentioned above, in certain situations, the mobile relay engages in a restricted handover procedure where the mobile relay does not engage in handovers between the base stations along the predetermined path. For the examples, the restricted handover procedure is invoked when the speed of the mobile relay relative to the base stations exceeds a threshold. The mobile relay monitors the group cell ID as well as the PCI during the restricted handover procedure but does not send a measurement report in response to detecting a change in the PCI between a source base station (first base station) and a target base station (second base station) when the group cell ID is the same for the two base stations. For the example of FIG. 1, the mobile relay engages in a transition procedure where communication between the mobile relay and the first base station transitions to communication between the mobile relay and the second base station. Although the network side of the transition is similar to a handover, the procedure is not characterized as a handover because over-the-air messaging between the mobile relay and the base stations is omitted during the transition procedure. The first base station, however, can still be referred to as a source base station and the second base station can still be referred to as target base station since the transition procedure involves transition of connectivity between the mobile relay and the base stations.

As described below with reference to FIG. 1B, transition procedures are typically managed by the base stations. The network controller 110 provides a position trigger to initiate a transition of the mobile relay from one base station to another. In some circumstances, however, the network controller 110, or multiple network controllers 110, can coordinate the transition. For the examples described herein, the network controller 110 generates the position trigger based on the position information received from the position monitor 138 to initiate the transition procedure but does not otherwise manage the transition. The base stations exchange messages to perform the transition of the mobile relay from the first base station to the second base station. Messaging performed within the system during the transition procedure is discussed in further detail with reference to FIG. 8. In the typical handover operation, the source base station (first base station 106) communicates directly with the target base station (second base station 108) over the X2 interface without additional management by the network controller 110. In situations where a direct link between the base stations is not available (i.e., no X2 link) or the base stations are associated with different network controllers 110, the network controller(s) 110 assist with transition procedures and handover procedures by routing the transition messages and handover messages from the source base station to the target base station. As discussed below in further detail, the controller 110 instructs the mobile relay 102 to invoke the restricted handover procedure and to monitor a group cell ID 130, 132 when the speed of the mobile relay relative to the base stations exceeds a threshold speed. When the mobile relay is traveling at high speed (a speed above the threshold) and monitoring the group cell ID, the mobile relay does not engage in the handovers between the base stations but rather engages in the transition procedure. Each base station communicates with the mobile relay 102 as it travels through the service areas 118, 120 of the base stations 106, 108. The communication system uses at least position information to accurately time transmissions and to allocate communication resources for the mobile relay at the appropriate times to facilitate continued communication as the mobile relay travels from cell to cell. For the examples, the first base station and the second base station exchange transition procedure messages to manage the transition of the mobile relay from the first base station to the second base station. In some situations, it may be necessary, or preferred, to allocate at least some management to the network controller 110. For example, the controller 110 may be tasked with managing communication between the base stations 106, 108 and the mobile relay 102 such that each base station transmits signals to the mobile relay at the appropriate times and allocates resources for receiving signals from the mobile relay when the mobile relay is in the service area of the base station. In the examples discussed herein, the mobile relay does not provide information to the network controller 110 regarding its position when the restricted handover procedure is invoked. Instead, the network controller 110 obtains position information from a position monitor 138 and generates the position trigger at least partially based on the received information.

The position monitor 138 may be any infrastructure or mechanism that provides the controller 110 and/or the base stations 106, 108 with adequate information for managing the timing of the communication between the base stations and mobile relays. For the examples where the mobile relay is carried on a high-speed train, infrastructure used for monitoring the position and speed of the train is used as the position monitor for the communication systems. One example of such an infrastructure includes The European Train Control System (ETCS) which is a standardized solution for signaling, control and monitoring of high-speed trains. In the case of Level 2 ETCS, all trains automatically report their exact position and direction of travel to the Radio Block Centre (RBC) at regular intervals. Train movements are monitored continually by the radio block centre. Another example of infrastructure that monitors train position includes the Italian Sistema Controllo Marcia Treno (SCMT). Sensors/Transponders are placed at various points on the track. When the train passes the information point, it is provided information about the next signal and other information. Such a system can be implemented to provide information regarding the position of the train. In some situations where the base stations manage the handovers, the position information may be provided directly to the base stations. For the examples discussed herein, however, the position information is received at the network controller 110 and the position trigger generated based on the position information. The position trigger is provided to the base stations to initiate the transition procedure. The controller 110 provides the position trigger to the source base station (first base station 106) where the position trigger indicates when to initiate transition of the mobile relay from the source base station to the target base station. Accordingly, the source base station triggers the transition of the mobile relay to the target base station in response to receipt of the position trigger. As mentioned above, however, the position information may be provided directly from the position monitor 138 to the base stations. In such a situation, the source base station (first base station) determines when to initiate the transition based on the transition information.

As explained above, the restricted handover procedure eliminates the over-the-air signaling between the mobile relay and the base station that would be present in a conventional handover of mobile device. From the network perspective, however, the a "handover" is still executed as the transition procedure since the source base station needs to inform the target base station of the transition of the mobile relay to the next base station in response to the position trigger received from the controller 110.

Figure 1B:
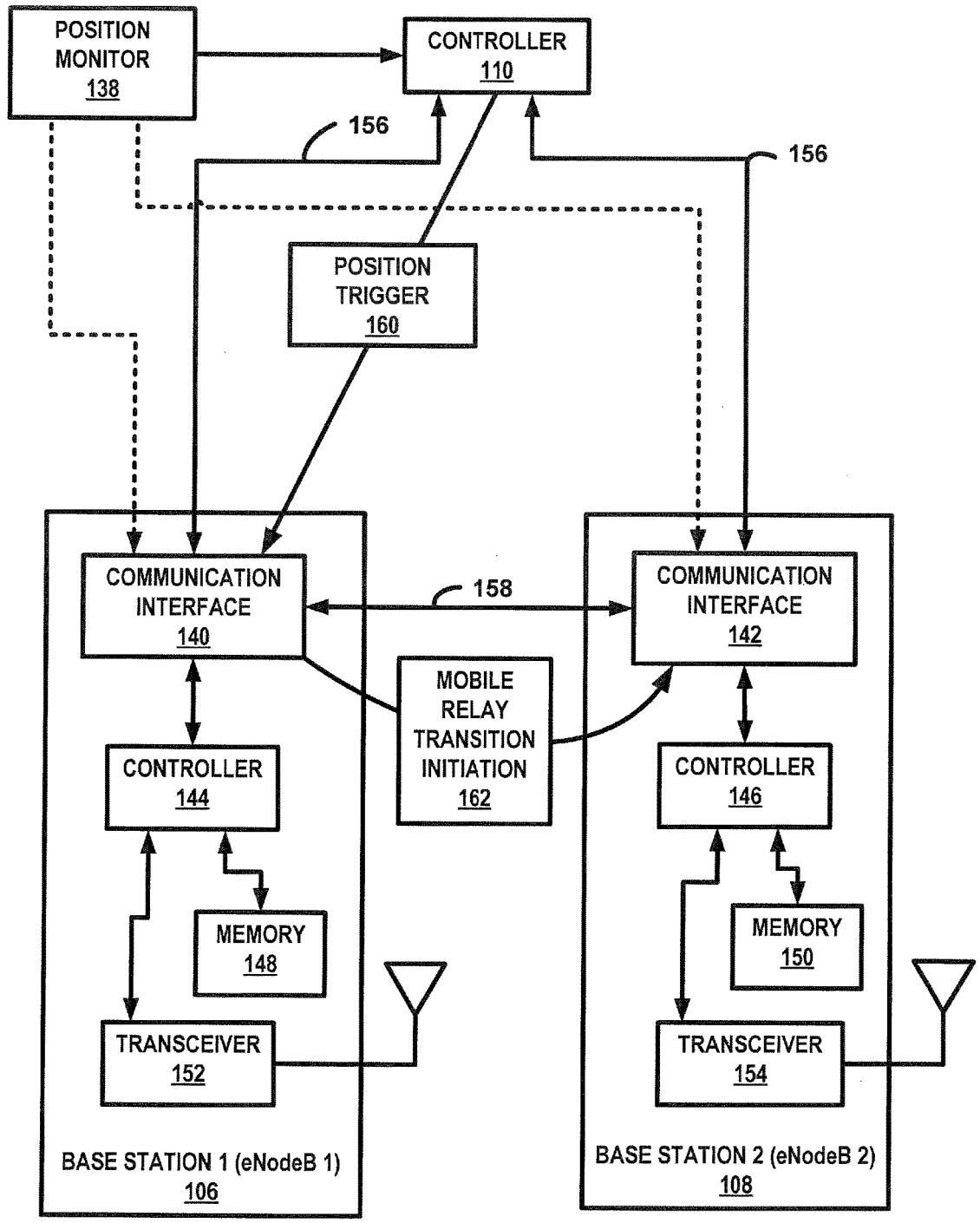
FIG. 1B is a block diagram of the base stations connected to the controller.

FIG. 1B is a block diagram of the first base station 106 and the second base station 108 connected to a controller 110. Each base station includes a communication interface 140, 142, a controller 144, 146, a memory 150, 152, and a transceiver 154, 156 as well as other components and circuitry (not shown). Each of the transceivers 140, 142 transmits downlink wireless signals to mobile wireless communication devices and mobile relays and receives uplink wireless signals from mobile wireless communication devices and mobile relays. Each controller 144, 136 controls components of the base station to manage the functions of the base station and facilitate the functions described herein as well as the overall functionality of the base station 106, 108. Each controller 144, 146 is connected to a memory 148, 150 which can be any suitable memory storage device capable of storing code and data. For the examples, each communication interface 140, 142 communicates with the network controller 110 and other base stations. The communication links between the network controller and the communication interface are in accordance with S1 signaling protocols and techniques while the communication links between base stations are in accordance with X2 signaling protocols and techniques. Accordingly, the network controller 110 is connected to the base stations through S1 communication links 156 and the base stations are connected to each other through an X2 communication link 158. Other communication links can be used in some circumstances.

In the example, the network controller 110 generates a position trigger 160 based on the position information provided to the network controller 110 by the position monitor 138. The position trigger 160 is sent to the communication interface 140 of the first base station (source base station) using S1 signaling. The controller 144 in the first base station 106 uses the position trigger 160 to initiate the transition of the mobile relay from the first base station to the second base station (target base station). The communication interface 140 sends a mobile relay transition initiation message 162 to the communication interface 142 of the second base station using X2 signaling. For the examples herein, the mobile relay transition initiation message 162 is similar to a handover request message in conventional schemes. The messaging between the base stations to facilitate the transition of the mobile relay from the first base station to the second base station is consistent with the messaging performed in a conventional system performing a handover.

Figure 2:
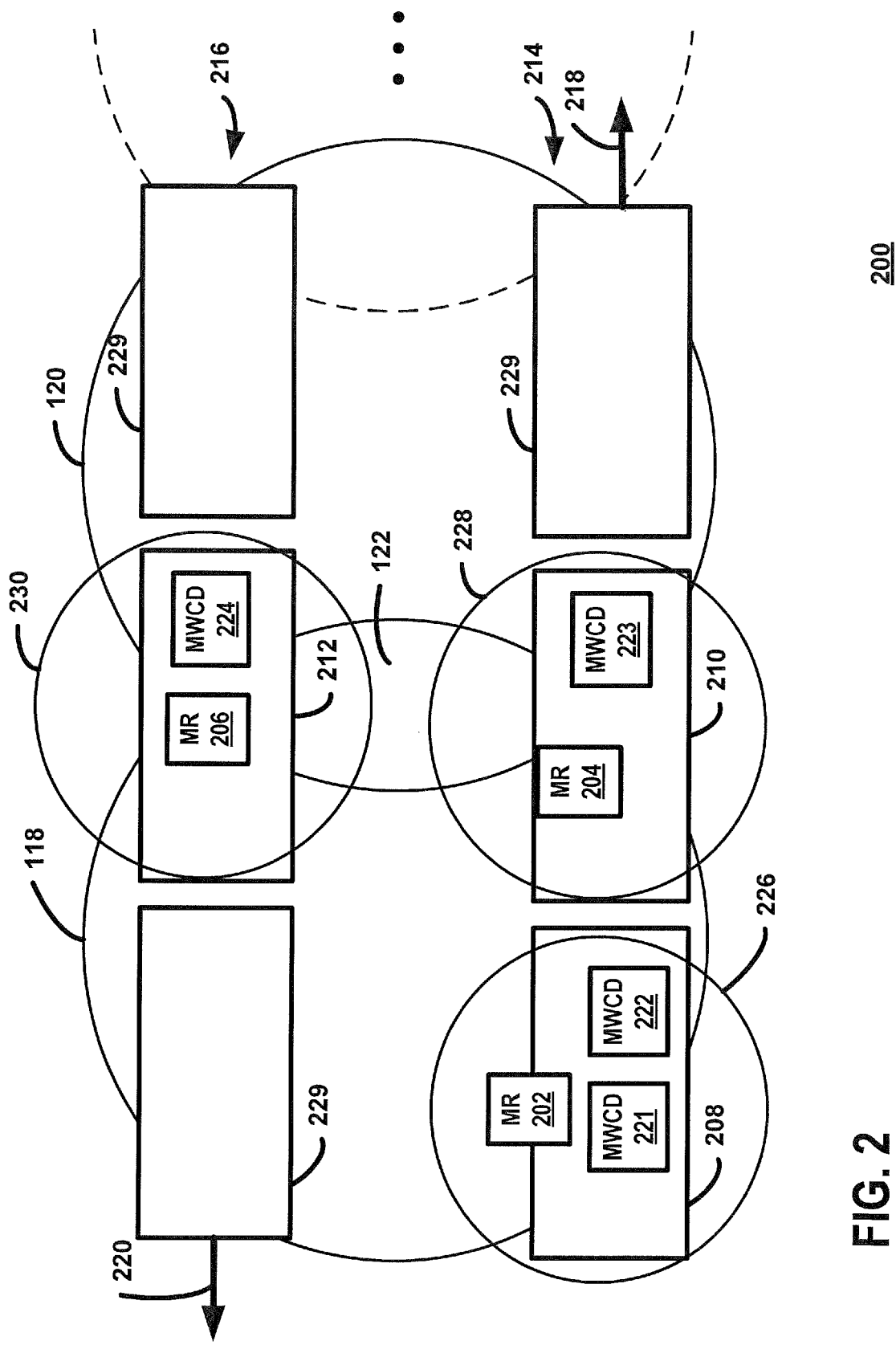
FIG. 2 is an illustration of a communication system for an example where mobile relays are located on train cars of high speed trains.

FIG. 2 is an illustration of a communication system 200 for an example where mobile relays 202, 204, 206 are located on or in train cars 208, 210, 212 of high-speed trains 214, 216. In some circumstances, the system 200 can be implemented to accommodate trains traveling in opposite directions. In FIG. 2, for example, a first train 214 is traveling in one direction 218 and a second train is traveling in a second direction 220. The rail in this example is the predetermined path 104 of FIG. 1.

In a typical high-speed train scenario, one or more mobile relays are positioned on the train such that each mobile relay provides service to mobile wireless communication devices 221-224 within one or more train cars 208, 210, 212. Accordingly, each mobile relay has a mobile relay service area 226, 228, 230 that covers at least a portion of space within at least one train car. For the example, each mobile relay has a service area that covers a single train car. In other implementations, a single mobile relay may cover multiple train cars or an entire train. For FIG. 2, each train 214, 216 includes other trains cars 229 that may or may not have additional mobile relays, depending on the particular implementation. On the first train 214, therefore, a first mobile relay 202 provides a first service area 226 that covers a first train car 208 and a second mobile relay 204 provides a second service area 228 that covers a second train car 210. The mobile communications devices 220, 221 in the first train car receive communication service from the first mobile relay 202 and the mobile wireless communication device 223 in the second train car 210 receives service from the second mobile relay 204. When the train 214 is at a train station or otherwise stopped, the mobile relays 202, 204, 206 communicate with the base stations 106, 108 similarly to techniques used by mobile wireless communication devices communicating with base stations. Accordingly, when stationary, the mobile relay uses the single cell ID of the base station for communication and monitors the sync channel to acquire the PCIs from neighboring base stations that are within range.

For the example, when the mobile relay is stationary, the mobile relay operates in accordance with known techniques used for a fixed relay in conventional systems and standards. The mobile relay continues to monitor the sync channel and receive the PCIs as it begins to move. If a PCI is received that does not match a currently stored PCI, the mobile relay sends a measurement report to the base station (source base station) currently serving the mobile relay. The source base station (e.g., first base station) configures the mobile relay to send a measurement report based on the newly discovered PCI of the target cell base station. Based on the results, the source base station determines if a handover should be performed. When warranted, handover procedures are executed to move the mobile relay to new target base stations along the path. For the example discussed herein, this handover management is used when the mobile relay is traveling at a speed less than a threshold. When the mobile relay has a speed that is equal to or exceeds the threshold, the restricted handover procedure is used to manage communication between the mobile relay and the base stations.

During the restricted handover procedure, the mobile relay continues to monitor the sync channel and receive the PCIs. The mobile relay, however, does not report detected changes in PCI to the source cell base station. The PCIs are received and used for communicating with the base stations. The mobile relay monitors the group cell ID transmitted by the base stations and only invokes a handover procedure if a newly received group cell ID differs from the current group cell ID.

Figure 3:
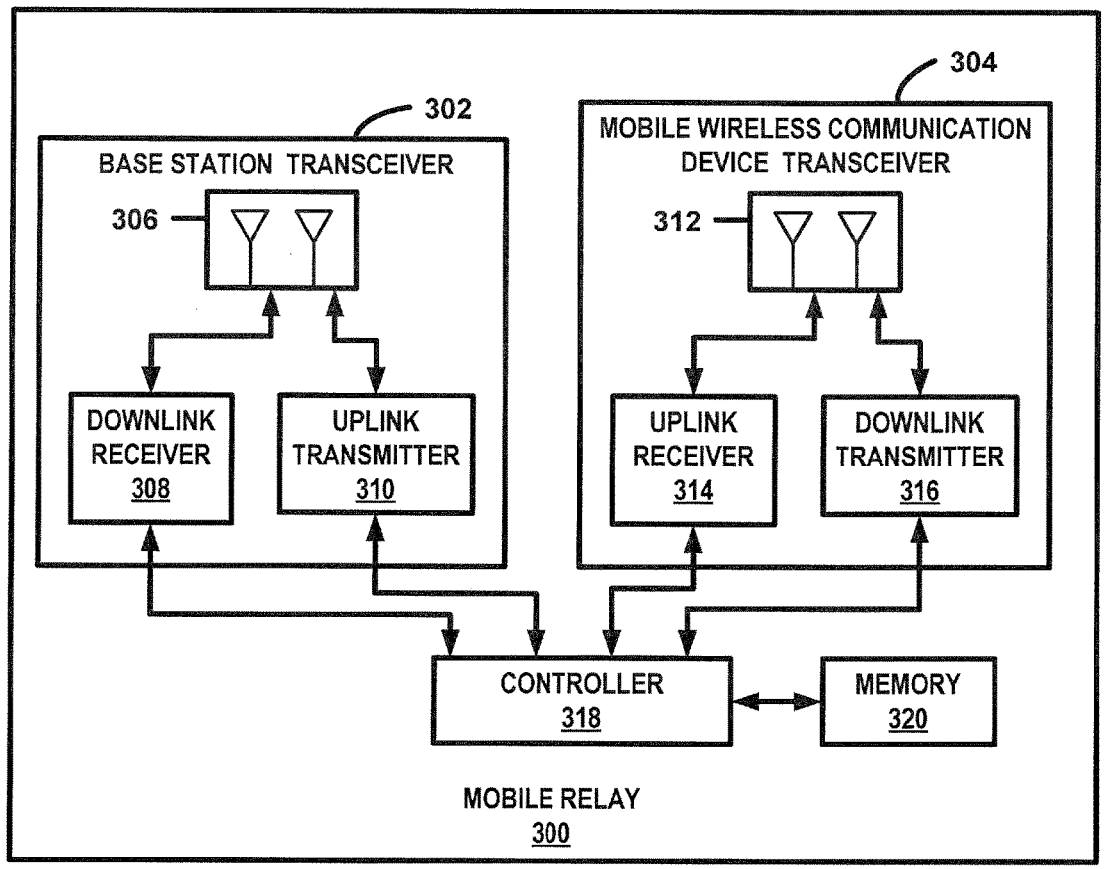
FIG. 3 is a block diagram of a mobile relay suitable for use as the mobile relay of FIG. 1 and the mobile relays of FIG. 2.

FIG. 3 is a block diagram of a mobile relay 300 suitable for use as the mobile relay 102 of FIG. 1 and the mobile relays 202, 204, 206 of FIG. 2. The mobile relay 300 includes a base station transceiver 302 for communicating with the base stations and mobile wireless communication device transceiver 304 for communicating with the mobile wireless communication devices. The base station transceiver 302 includes at least one antenna 306, a downlink receiver 308 and an uplink transmitter 310. The wireless communication device transceiver 304 includes at least one antenna 312, an uplink receiver 314, and a downlink transmitter 316. A controller 318 manages the tasks of the mobile relay 300 described herein as well as facilitating the overall functionality of the mobile relay. A memory 320 may be part of the controller 318 or a separate device and is used to store data as well as code. The various functions and operations of the blocks described with reference to the mobile relay 300 may be implemented in any number of devices, circuits, or elements. Two or more of the functional blocks may be integrated in a single device and the functions described as performed in any single device may be implemented over several devices. For example, the downlink receiver and the uplink receiver may be implemented in a device. Further, one or more antennas may be shared by the various transceiver components.

Figure 4:
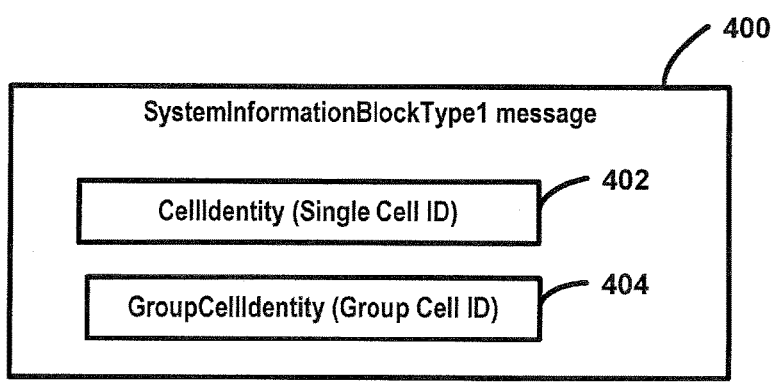
FIG. 4 is a block diagram of an example of system information block type 1 message suitable for broadcasting the single cell ID and the group cell ID.

FIG. 4 is a block diagram of an example of system information block type 1 message suitable for broadcasting the single cell ID and the group cell ID. As discussed above, the group cell ID and the single cell ID are broadcasted in a System Information Block Type 1 Message (SIB1 message) 400 that is modified from the current 3GPP LTE specification. For the examples, the SIB1 message 400 is a modified version of the SIB1 message defined by 3GPP in TS 36.331. For the examples herein, the SIB1 message 400 conforms to the current 3GPP LTE specification with the exception that it includes a Group Cell ID field 404. The Cell ID field specified by the current standard is used at the Single Cell ID field 402. Accordingly, the single cell ID 126, 128 is transmitted within the single cell ID field 402 and the group cell ID 130, 132 is transmitted in the Group Cell ID field 404.

Figure 5:
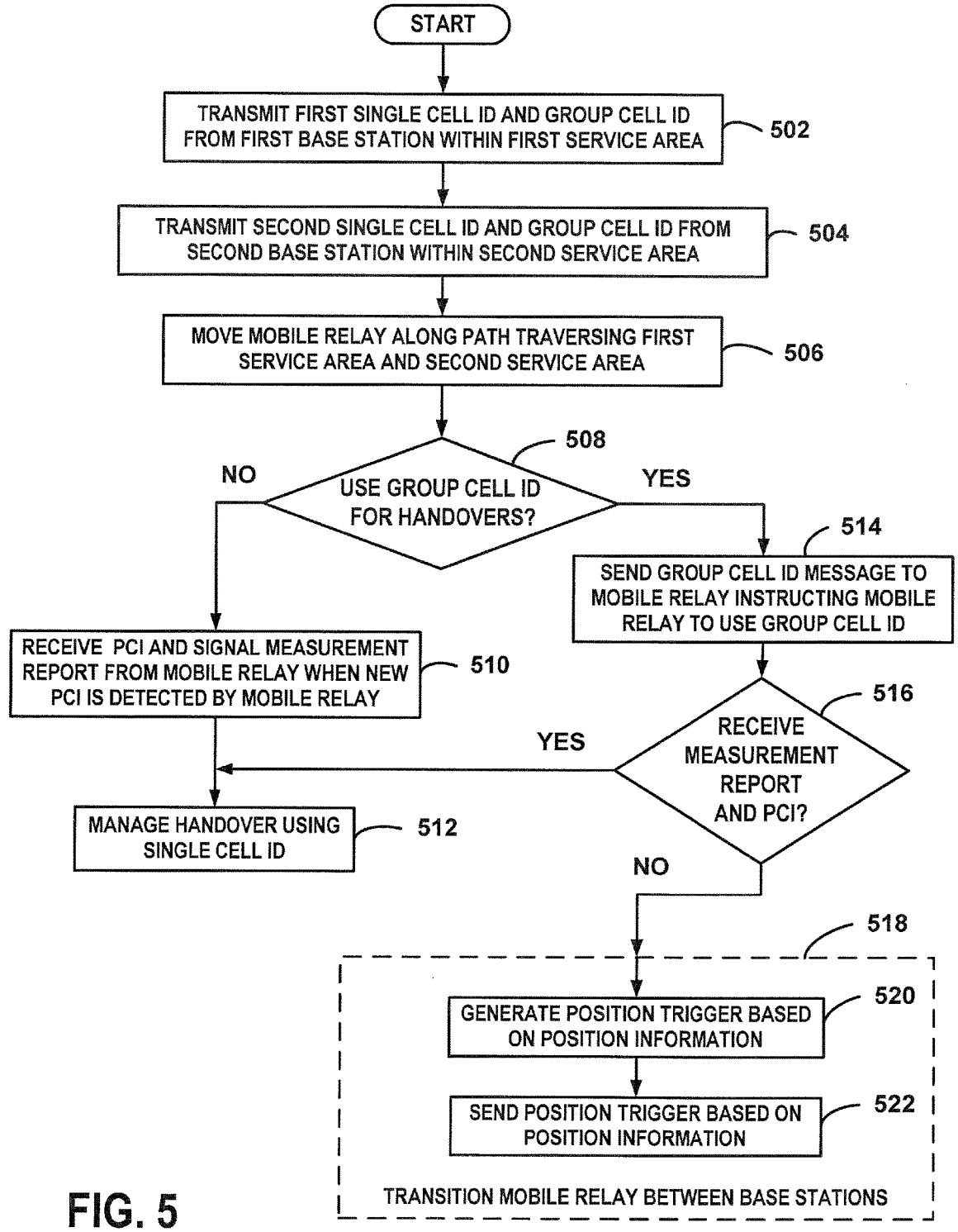
FIG. 5 is a flowchart of a method performed in a network of a wireless communication system with a mobile relay.

FIG. 5 is a flowchart of a method performed in a network of a wireless communication system with a mobile relay. Although the method may be implemented in other systems in some circumstances, the example discussed with reference to FIG. 5 is performed in the system of FIG. 1. Accordingly, the method is performed in accordance with 3GPP LTE communication specifications. The method is discussed with reference to two base stations. During typical operation, however, the method is repeated as the mobile relay travels along the path. When the mobile relay moves toward a third base station adjacent to the second base station, the second base station can be referred to as a first base station and a third base station is interpreted as the second base station in the exemplary methods described herein.

At step 502, a first single cell ID and a group cell ID is transmitted within the first service area by the first base station. The first base station transmits a S1B1 message 400 that includes the Single Cell ID (402) representing the single cell ID 126 of the first base station and includes the Group Cell ID 404 representing the group cell ID 130 of the first base station.

At step 504, a second single cell ID and the group cell ID is transmitted with a second service area by the second base station. The second base station transmits a S1B1 message 400 that includes the Single Cell ID (402) representing the single cell ID 128 of the second base station and includes the Group Cell ID 404 representing the group cell ID 132 of the second base station. Since the group cell ID 130 of the first base station is the same as the group cell ID 132 of the second base station, the base stations transmit different single cell IDs and transmit the same group cell ID.

At step 506, the mobile relay is moved along the path traversing the first service area and the second service area. The mobile relay travels along the same general path as traveled by the mobile wireless communication devices. Where the system is implemented within a high-speed rail system, the mobile relay is mounted or otherwise situated on or within a train car and, therefore, follows the same path as the mobile wireless communication devices within the train cars. As discussed above, the service areas at least partially overlap and are provided by adjacent base stations arranged along the pre-determined path.

At step 508, it is determined whether the group cell ID should be monitored for purposes of handover management. In the examples, the network evaluates at least the speed of the mobile relay to determine whether the group cell ID or the single cell ID should be monitored by the mobile relay. If the speed is greater than or equal to a threshold, it is determined that the group cell ID should be monitored. It is determined that the single cell ID should be used when the speed is below the threshold. If it is determined that the group cell ID should be used for handovers, the method proceeds to step 514. Otherwise, the method continues at step 510.

At step 510, a signal measurement report is received from the mobile relay at the first base station after a new physical cell ID (PCI) is detected by the mobile relay. In accordance with known techniques, the mobile relay monitors the sync channel for the PCI. The mobile relay compares the PCI received from the second base station to the PCI in memory which, for the example, is the PCI of the first base station. When the mobile relay detects that the PCI do not match, the mobile relay measures a signal strength of a reference single from the second base station. A measurement report containing the measurement and the PCI are sent to the first base station (source base station) if the signal level of the reference signal exceeds the pre-configured threshold.

At step 512, the network manages the handovers based on the single cell ID. The handover procedure, therefore, is in accordance with the conventional procedures used for handovers of mobile wireless communication devices. Depending on the particular circumstances, the network may instruct the mobile wireless communication device to read the single cell ID from the SIB1 and report the results. Typically, the controller instructs the mobile relay to acquire, using the new PCI, the single cell ID that is broadcast in the SIB1 message. The information is used to uniquely identify the second base station before proceeding with the handover operation.

At step 514, a group cell ID message is sent to the mobile relay to instruct the mobile relay to use the group cell ID. Various techniques may be used to inform and manage the mobile relay in order that the mobile relay monitors the appropriate cell ID. In the examples herein, the mobile relay uses the single cell ID as a default and is instructed to use the group cell ID when the speed exceeds the threshold. If the network controller 110 determines that the single cell should be used again, the controller 110 instructs the mobile relay to use the single cell ID. Various techniques may be used to instruct the mobile relay. An example of a suitable technique includes using dedicated RRC messages to inform the mobile relay of the change. Accordingly, the controller sends, through the base stations, a dedicated RRC message to instruct the mobile relay which cell ID to monitor.

At step 516, the controller within the network determines whether a measurement report and PCI have been received from the mobile relay. As explained below in further detail, the mobile relay monitors the sync channel for the PCI as well as the group cell ID in the SIB1. If the PCI changes and the SIB1 from the second base station does not contain the stored (or contains a different) group cell ID, the mobile relay measures the reference signal of the second base station and sends a measurement report, as well as the newly received PCI, to the first base station according to the conventional operation. If the PCI changes and the group cell ID matches, the mobile relay does not send a measurement report. If a measurement report is received from the mobile relay, the method continues at step 512, where handovers are managed using the single cell ID in accordance with conventional handover procedures. Therefore, there may be circumstances where the mobile relay transmits the measurement report when monitoring the group cell ID. The mobile relay may detect an alternate base station having a significantly high reference signal that is not the next base station in the mobile relay path. The alternate base station may have a different group cell ID or may not be transmitting any group cell ID. For example, a base station near the path, but not necessarily intended to serve the mobile relay, may not be configured to transmit a group cell ID. If it is determined that no measurement report has been received from the mobile relay, the method continues at step 518.

At step 518, the mobile relay is transitioned between the base stations along the path without performing handovers. The transition procedure is performed where the base station serving the mobile relay is changed based on the position of the mobile relay without the mobile relay engaging in over-the-air handover messages.

At step 520, the network controller 110 generates a position trigger based on position information received from the position monitor 138. As described above, the position information is information that indicates the position of the mobile relay and may be derived or based on information available from high-speed train infrastructure that tracks the position of the train.

At step 522, the position trigger 160 is transmitted to the first base station (source base station) to initiate the transition procedure. The position trigger 160, therefore, notifies the source base station that the mobile relay should be transitioned to the next base station. In response to the position trigger 160, the first base station sends the mobile relay transition initiation message 162 to the second base station to inform the second base station of the transition procedure. The second base station allocates time-frequency resources for uplink and downlink communication with the mobile relay. The transition procedure between the first base station and the second base station does not require any input from the mobile relay as is needed in the conventional handover procedures. The mobile relay uses the PCI of the second base station as needed for communication but does not initiate a handover procedure when entering the second service area. Accordingly, the mobile relay exchanges data signals with the first base station followed by exchanging data signals with the second base station without sending a measurement report or otherwise performing a handover procedure.

Figure 6:
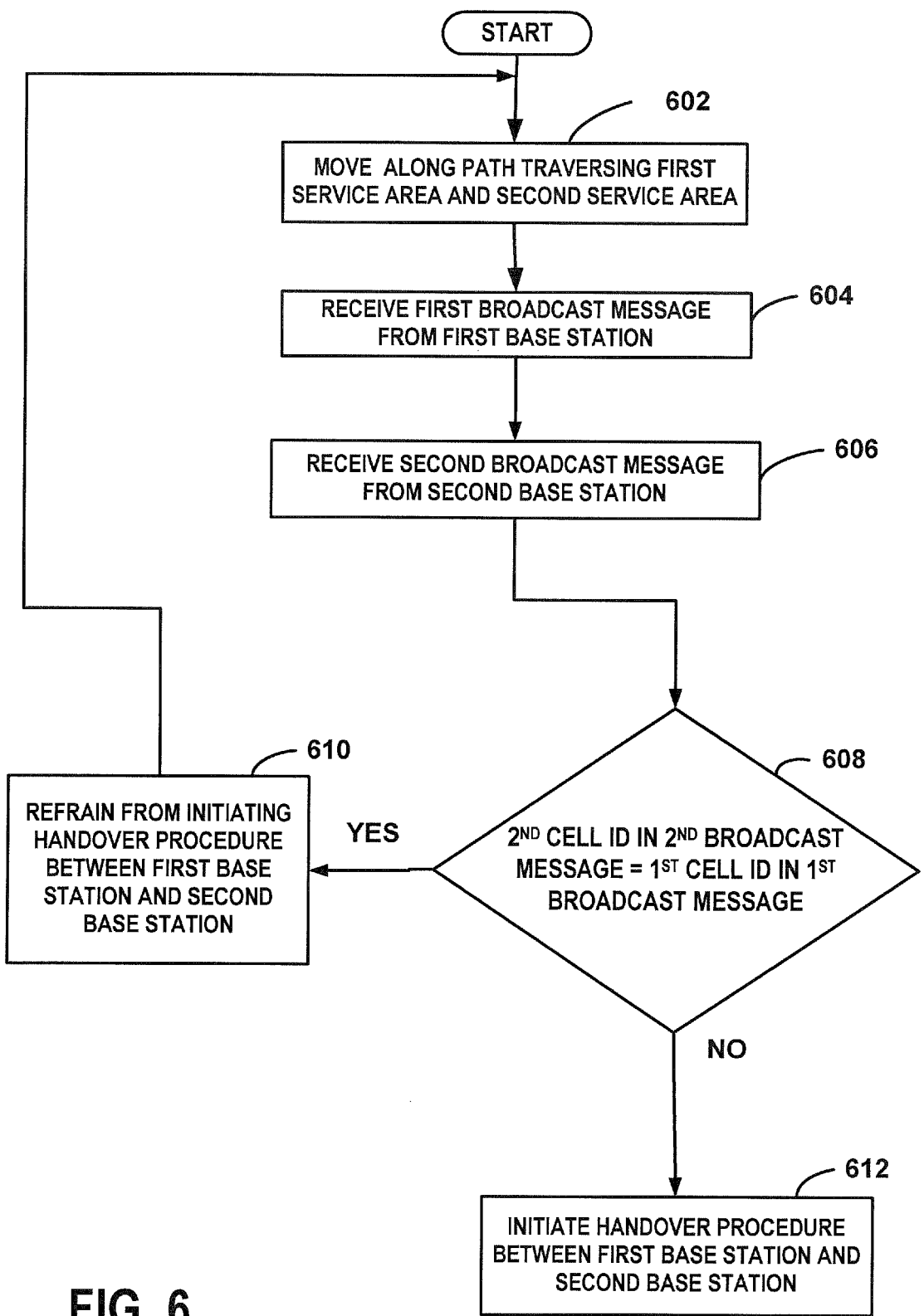
FIG. 6 is a flowchart of a method performed in a mobile relay of a wireless communication system.

FIG. 6 is a flowchart of a method performed in a mobile relay of a wireless communication system. The method facilitates a restricted handover procedure where the mobile relay refrains from exchanging messages with the base stations when transitioning between the service areas. Although the method may be implemented in other systems in some circumstances, the example discussed with reference to FIG. 6 is performed in the mobile relay 102. Accordingly, the method is performed in accordance with 3GPP LTE communication specifications. The method is discussed with reference to two base stations. As discussed above, the method is typically repeated as the mobile relay travels along the path.

At step 602, the mobile relay is moved along the path traversing the first service area and the second service area. The mobile relay travels along the same general path as traveled by the mobile wireless communication devices. Where the system is implemented within a high-speed rail system, the mobile relay is mounted or otherwise situated on or within a train car and, therefore, travels the same path as the mobile wireless communication devices within the train cars. As discussed above, the service areas at least partially overlap and are provided by adjacent base stations arranged along the pre-determined path.

At step 604, a first broadcast message is received from the first base station. For the examples herein, the first broadcast message is a SIB1 message 400 that includes a single cell ID 402 and a group cell ID 404.

At step 606, a second broadcast message is received from the second base station. The second broadcast message is a SIB1 message 400 that includes at least a single cell ID 402 and may also contain a group cell ID 404.

At step 608, it is determined whether the group cell IDs in the first broadcast message and the second broadcast message match. The cell IDs are determined to match if contents of the group cell ID fields in the SIB1 messages are the same. If the group cell ID field does not exist in the second SIB1 message, it is determined that there is not a match. If there is a match, the method returns to step 602 where the mobile relay continues moving and monitoring the group cell ID. Accordingly, in returning to step 602, the mobile relay refrains from initiating a handover procedure at step 610. If the cell IDs do not match, the method continues at step 612.

At step 612, the mobile relay initiates a handover procedure by sending a signal measurement report to the first base station. The network responds with a message instructing the mobile relay to read the single cell ID and report the results. The handover is performed in accordance with conventional techniques for managing handovers with mobile wireless communication devices. In some situations, a handover procedure is not executed or completed. Therefore, the network may not respond with instructions relating to completing a handover when the signal measurement report is sent by the mobile relay.

Figure 7:
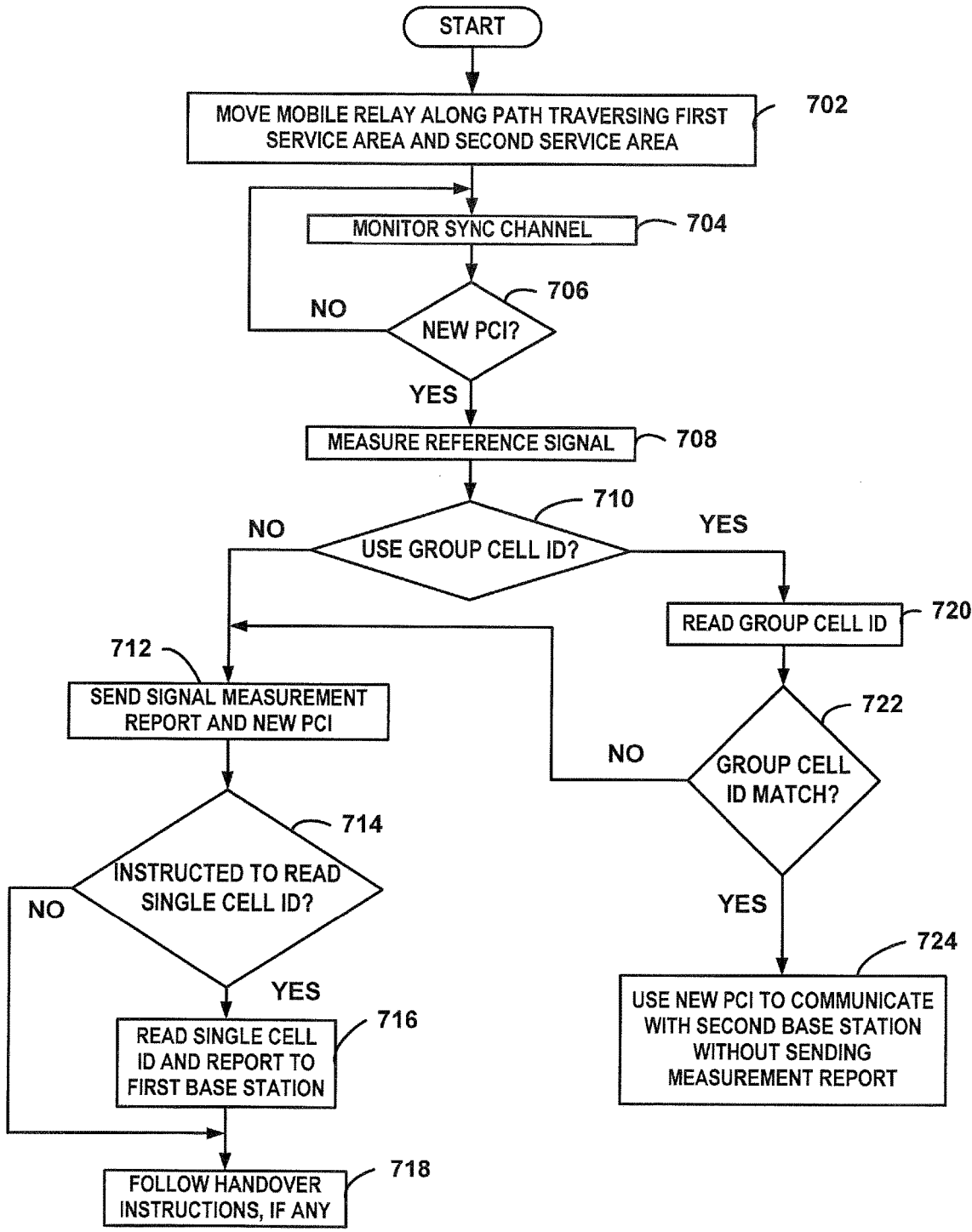
FIG. 7 is a flowchart of an example of implementing the method discussed with reference to FIG. 6.

FIG. 7 is a flowchart of an example of implementing the method discussed with reference to FIG. 6.

At step 702, the mobile relay is moved along the path traversing the first service area and the second service area.

At step 704, the mobile relay monitors the sync channel. In accordance with known techniques, the mobile relay receives signals transmitted from nearby base stations and deciphers the sync channel to obtain the PCI of the transmitting base station.

At step 706, the mobile relay determines whether a new PCI has been received. The most recently received PCI is compared to the PCI stored in memory. If the PCIs match, it is determined that the PCI is not new and has been received by the currently serving base station (first base station). The mobile relay continues to monitor the sync channel. If the PCI is new, the method continues at step 708.

At step 708, a reference signal corresponding to the new PCI is measured.

At step 710, the mobile relay determines whether the group cell ID should be used for handovers. If an instruction from the network has been received instructing the mobile relay to use the group cell ID, the method continues at step 720. Otherwise, the method proceeds to step 712.

At step 712, the mobile relay sends the measurement report including the measurement of the reference signal to the first base station. The PCI is also transmitted.

At step 714, the mobile relay determines if the network has instructed the mobile relay to read and report the cell ID (single cell ID) of the base station transmitting the new PCI (e.g., second base station). If the mobile relay has been instructed to read and report the single cell ID, the method continues as step 716 where the cell ID is read and reported to the first base station. Otherwise, the method proceeds to step 718 where the mobile relay follows any handover instructions provided by the network.

At step 720, the mobile relay reads the group cell ID from broadcast messages. The group cell ID from a first SIB1 message sent from the first base station is read and stored in memory. As the mobile relay continues traveling along the path, the mobile relay continues to monitor the group cell ID field in the SIB1 messages as well as the sync channel. When the second SIB1 message is received from the second base station, the group cell ID field is evaluated to read the second group cell ID.

At step 722, it is determined whether the first group cell ID matches the second group cell ID. The group cell IDs are determined to match if contents of the group cell ID fields in the SIB1 messages are the same. If the group cell ID field does not exist in the second SIB1 message, it is determined that there is not a match. If there is a match, the method continues at step 724 where the newly detected PCI is used to communicate with the second base station without sending a measurement report to the first base station. If the group cell IDs do not match, the method proceeds to step 712 where the signal measurement report is sent to the first base station to potentially initiate the handover procedure.

Figure 8:
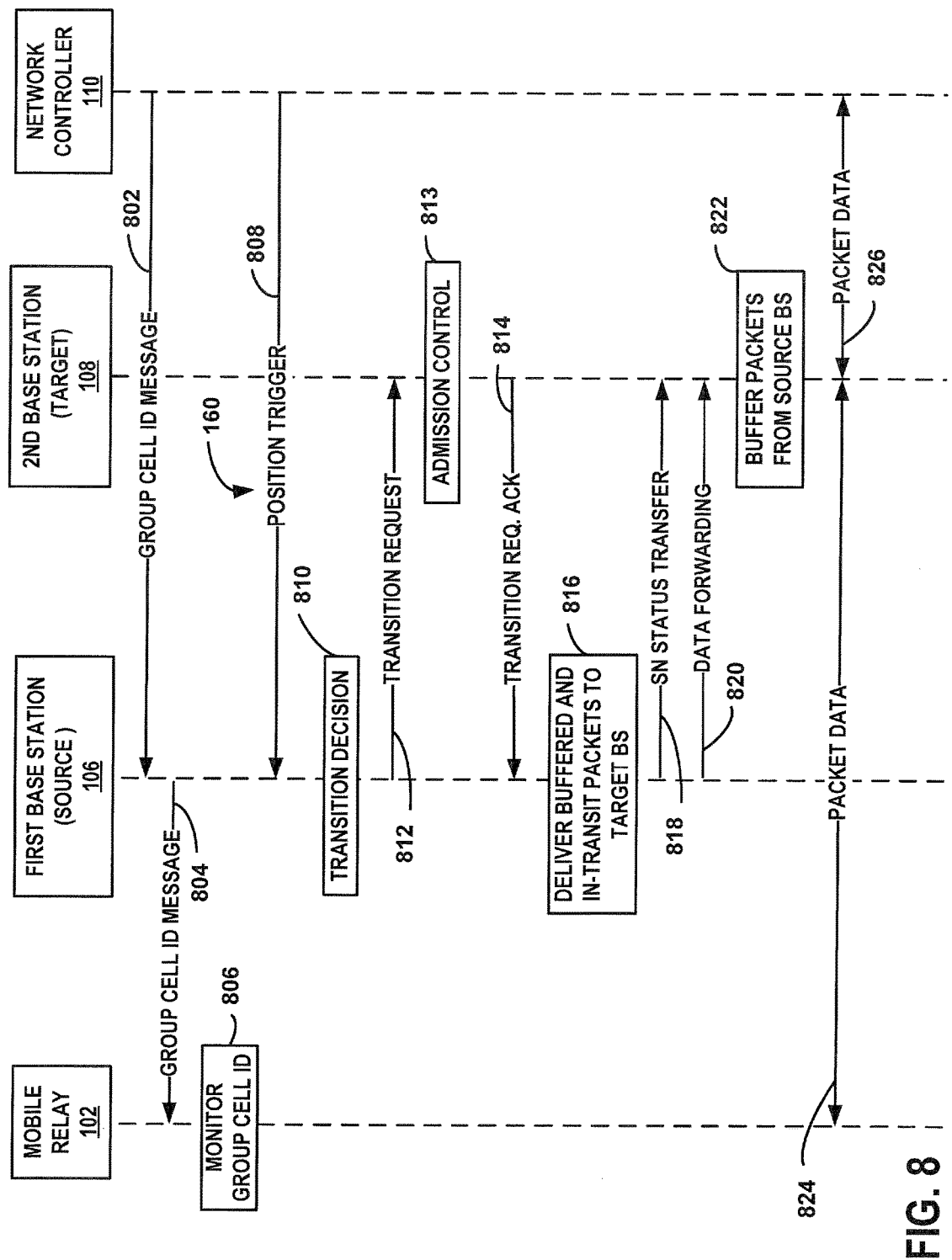
FIG. 8 is a message and event diagram in the cellular communication system.

FIG. 8 is a message and event diagram in the cellular communication system where the diagram illustrates at least some of the messages and events that place the mobile relay in the restricted handover state and that occur during a transition procedure when the mobile relay is engaged in the restricted handover procedure.

At event 802, the network controller 110 sends a group cell ID message to the base station currently serving the mobile relay. The example of FIG. 8 begins with the mobile relay communicating with the first base station 106. Accordingly, the group cell ID message is sent to the first base station 106. At event 804, the first base station 106 forwards the group cell ID message to the mobile relay 102. As discussed above, a suitable technique for transmitting the message includes transmitting the group cell ID message as an RRC message from the first base station 106.

At event 806, the mobile relay 806 determines that the group cell ID should be monitored. In response to the group cell ID message, the mobile relay begins monitoring the group cell ID instead of the single cell ID.

At event 808, the network controller 110 sends the position trigger 160 to the first base station (source base station) 106. A suitable technique for transmitting the position trigger includes sending the message over the S1 communication link. In some circumstances, the source base station may obtain the position trigger directly from other sources, such as from other neighboring base stations over the X2 link. The information can be relayed from one base station to another.

At event 810, the first base station 106 makes a transition decision to transition the mobile relay from the first base station to the second base station. The transition decision is similar to a conventional handover decision. Accordingly, the transition decision is in response to the position trigger similarly to a handover decision that is in response to a measurement report from a mobile device.

At event 812, a transition request is sent from the first base station (source) to the second base station (target). The transition request is similar to a conventional handover request. Therefore, the source base station issues the transition request message to the target base station passing necessary information to prepare for the transition at the target side.

At event 813, the target base station performs admission control.

At event 814, the second base station returns a transition request acknowledgment to the first base station. The transition request acknowledgment is similar to a conventional handover request acknowledgment. The target base station prepares for the transition with L1/L2 and sends the HANDOVER REQUEST ACKNOWLEDGE to the source base station.

At event 816, buffered and in-transit packets are delivered to the target base station.

At event 818, the source base station sends the SN STATUS TRANSFER message to the target base station to convey the uplink PDCP SN receiver status and the downlink PDCP SN transmitter status of E-RABs for which PDCP status preservation applies (i.e., for RLC AM). The uplink PDCP SN receiver status includes at least the PDCP SN of the first missing UL SDU and may include a bit map of the receive status of the out of sequence UL SDUs that the UE needs to retransmit in the target cell, if there are any such SDUs. The downlink PDCP SN transmitter status indicates the next PDCP SN that the target eNB shall assign to new SDUs, not having a PDCP SN yet. The source eNB may omit sending this message if none of the E-RABs of the UE shall be treated with PDCP status preservation.

At event 820, data is forwarded from the source base station to the target base station.

At event 822, data packets from the source base station are buffered at the target base station.

At events 824 and event 826, the target base station exchanges data with the mobile relay.

Additional messages may be sent in accordance with known techniques to finalize the transition of service from the first base station to the second base station. An example includes transmission of a PATH SWITCH REQUEST message from the target base station to MME in the network controller to inform network controller that the mobile relay has changed cells. Another example includes a MODIFY BEARER REQUEST message from the MME to the Serving Gateway. The Serving Gateway then switches the downlink data path to the target side. The Serving Gateway sends one or more "end marker" packets on the old path to the source base station and then can release any U-plane/TNL resources towards the source base station.

Clearly, other embodiments and modifications of this invention will occur readily to those of ordinary skill in the art in view of these teachings. The above description is illustrative and not restrictive. This invention is to be limited only by the following claims, which include all such embodiments and modifications when viewed in conjunction with the above specification and accompanying drawings. The scope of the invention should, therefore, be determined not with reference to the above description, but instead should be determined with reference to the appended claims along with their full scope of equivalents.

What is claimed is:

1. A cellular communication system comprising:
    a first base station configured to transmit, within a first service area, a first single cell identifier and a group cell identifier; and
    a second base station configured to transmit, within a second service area that at least partially overlaps the first service area, a second single cell identifier and the group cell identifier.

2. The cellular communication system of claim 1, further comprising:
    a mobile relay configured to:
        move along a path traversing the first service area and the second service area at a speed relative to the first base station and the second base station;
        when the speed is less than a threshold, transmit a signal measurement report to the first base station to initiate a handover procedure between the first base station and the second base station based on the single cell identifiers; and
        when the speed is greater than or equal to the threshold, transmit the signal measurement report to initiate the handover procedure based on the group cell identifier.

3. The cellular communication system of claim 2, wherein the mobile relay is configured to transmit the signal measurement report based on the group cell identifier by refraining to transmit the signal measurement report when the group cell ID received from the first base station is the same as the group cell ID received from the second base station.

4. The cellular communication system of claim 3, wherein the mobile relay is further configured to, in response to detecting that the group cell identifier received from the first base station is the same as the group cell identifier received from the second base station, exchange data signals with the second base station after exchanging data signals with the first base station without performing the handover procedure between the first base station and the second base station.

5. The cellular communication system of claim 4, further comprising a network controller configured to send a position trigger to initiate a transition of communication service to the mobile relay from the first base station to the second base station.

6. The cellular communication system of claim 5, wherein base stations are arranged along a path of a train and the mobile relay is situated on the train.

7. The cellular communication system of claim 1, wherein the cellular communication operates in accordance with a Third-Generation Partnership Project Long-Term Evolution (3GPP LTE) communication specification.

8. The cellular communication system of claim 7, wherein the first base station is configured to broadcast the first single cell identifier and the group cell identifier is a first System Information Block Type 1 (SIB1) message and the second base station is configured to broadcast the second single cell identifier and the group cell identifier in a second System Information Block Type 1 (SIB1) message.

9. A method performed in a cellular communication system, the method comprising:

transmitting, within a first service area of a first base station, a first single cell identifier (first single cell ID) and a first group cell identifier (first group cell ID); and transmitting, within a second service area of a second base station, a second single cell identifier (second cell ID) and the first group cell ID, the second service area at least partially overlapping the first service area.

10. The method of claim 9, further comprising:

moving a mobile relay along a path traversing the first service area and the second service area at a speed relative to the first base station and the second base station;

initiating a handover procedure between the first base station and the second base station based on the single cell IDs when the speed is less than a threshold; and initiating a transition procedure between the first base station and the second base station based on the group cell ID when the speed is greater than or equal to the threshold.

11. The method of claim 10, further comprising:

in response to detecting that the group cell ID received from the first base station is the same as the group cell ID received from the second base station and after exchanging data signals between the mobile relay and the first base station, exchanging data signals between the mobile relay and the second base station without performing the handover procedure between the first base station and the second base station.

12. The method of claim 11, further comprising:

initiating the transition procedure by sending a position trigger message to the first base station.

13. The method of claim 12, wherein the base stations are arranged along a path of a train and the mobile relay is situated on the train.

14. A method performed at a mobile relay, the method comprising:

moving relative to a first base station and a second base station;

receiving a first broadcast message from the first base station, the first broadcast message comprising a first single cell identifier;

receiving a second broadcast message from the second base station, the second broadcast message comprising a second single cell identifier;

determining that the first broadcast message and the second broadcast message contain a same group cell identifier (group cell ID); and in response to determining that the broadcast messages contain the same group cell ID, refraining from initiating a handover procedure between the first base station and the second base station.

15. The method of claim 14, wherein the first broadcast message and the second broadcast message are System Information Block Type 1 (SIB1) messages.

16. The method of claim 14, wherein the determining that the first broadcast message and the second broadcast message contain the same cell ID comprises:

determining that the second broadcast message includes a group cell ID; and determining that the group cell ID of the second broadcast message is the same as a group cell ID transmitted in the first broadcast message.

17. A method performed at a mobile relay, the method comprising:

moving relative to a first base station and to a second base station;

receiving a first broadcast message from the first base station, the first broadcast message comprising a first single cell identifier;

receiving a second broadcast message from the second base station, the second broadcast message comprising a second single cell identifier;

monitoring a broadcast channel for a group cell identifier (group cell ID);

monitoring a sync channel for a physical cell identifier (PCI);

determining that the first PCI received from the first base station is different from a second PCI received from the second base station;

after exchanging data signals with the first base station, exchanging data signals with the second base station without reporting a signal strength measurement to the first base station; and refraining to send the signal strength measurement in response to determining a first group cell ID received from the first base station is the same as a second group cell ID received from the second base station.

18. The method of claim 17, wherein refraining to send the signal strength measurement avoids initiating a handover procedure.

19. The method of claim 17, further comprising:

receiving the first group cell ID in a first System Information Block Type 1 (SIB1) message broadcasted from the first base station; and receiving the second group cell ID in a second System Information Block Type 1 (SIB1) message broadcasted from the second base station.

* * * * *